(12) United States Patent
Park et al.

(10) Patent No.: US 8,526,286 B2
(45) Date of Patent: Sep. 3, 2013

(54) OPTICAL PICK-UP APPARATUS WITH DIFFRACTIVE OPTICAL ELEMENT AND OPTICAL RECORDING/REPRODUCING APPARATUS HAVING THE SAME

(75) Inventors: Seong-su Park, Hwaseong-si (KR); Joji Anzai, Suwon-si (KR); Yong-han Yoon, Suwon-si (KP); Jong-uk Kim, Yongin-si (KR); Ichiro Morishita, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/316,085

(22) Filed: Dec. 9, 2011

(65) Prior Publication Data

US 2012/0155240 A1 Jun. 21, 2012

(30) Foreign Application Priority Data

Dec. 17, 2010 (KR) .................. 10-2010-0129808

(51) Int. Cl.
*G11B 7/00* (2006.01)
(52) U.S. Cl.
USPC ........................... 369/112.05; 369/94

(58) Field of Classification Search
None
See application file for complete search history.

(56) References Cited

U.S. PATENT DOCUMENTS

| | | | |
|---|---|---|---|
| 6,118,594 A * | 9/2000 | Maruyama | 359/719 |
| 2002/0181352 A1 * | 12/2002 | Saimi et al. | 369/44.37 |
| 2004/0160885 A1 * | 8/2004 | Kimura | 369/112.09 |
| 2004/0213131 A1 * | 10/2004 | Kimura et al. | 369/112.03 |
| 2011/0235492 A1 * | 9/2011 | Yamasaki et al. | 369/101 |
| 2012/0011523 A1 * | 1/2012 | Komma et al. | 720/695 |

\* cited by examiner

*Primary Examiner* — Paul Huber
(74) *Attorney, Agent, or Firm* — Sughrue Mion, PLLC

(57) ABSTRACT

An optical pick-up apparatus for reproducing information recorded on an optical recording medium or recording information on the optical recording medium is provided. The optical pick-up apparatus includes a light source unit which generates beams; a diffraction element which diffracts the generated beams; and an objective lens which focuses a p order diffracted beam which is used for recording and reproducing information among a plurality of diffracted beams which are diffracted by the diffraction element on any one of a plurality of information layers which are formed on an optical recording medium. A p±1 order diffracted beam which is not used for recording and reproducing information is focused away from the plurality of information recording layers and on the surface of the optical recording medium.

16 Claims, 6 Drawing Sheets

OPTICAL PICK-UP APPARATUS WITH DIFFRACTIVE OPTICAL ELEMENT AND OPTICAL RECORDING/REPRODUCING APPARATUS HAVING THE SAME

CROSS-REFERENCE TO RELATED APPLICATION

This application claims priority from Korean Patent Application No. 10-2010-0129808, filed on Dec. 17, 2010 in the Korean Intellectual Property Office, the disclosure of which is incorporated herein by reference in its entirety.

BACKGROUND

1. Field

Apparatuses and methods consistent with the exemplary embodiments generally relate to an optical pick-up apparatus, and more particularly, to an optical pick-up apparatus using a diffracted beam.

2. Description of the Related Art

An optical pick-up apparatus is an apparatus recording information on an optical recording medium or reproducing information recorded on an optical recording medium. The optical recording media include a CD (Compact Disc) using a beam with a wavelength of approximately 780 nm, a DVD (Digital Versatile Disc) using a beam with a wavelength of approximately 660 nm and a BD (Blu-ray Disc) using a beam with a wavelength of approximately 405 nm and the optical recording media have different structures from each other. Recently, a compatible optical pick-up apparatus which can be used with various types of optical recording media is being developed.

One of the approaches to develop such a compatible optical pick-up apparatus is to use a plurality of objective lenses. In other words, the optical pick-up apparatus includes an objective lens for each of a CD, a DVD, and a BD. However, with this approach minimization of the optical pick-up apparatus cannot be achieved.

Another approach to develop a compatible optical pick-up apparatus is to use a diffraction element in an optical system of the optical pick-up apparatus. Such a diffraction element may correct an aberration generated by a structure of various kinds of an optical recording medium, various beams with different wavelengths and temperature changes. In this case, minimization of the optical pick-up apparatus is possible as one objective lens is used instead of the plurality of objective lenses.

For the optical pick-up apparatus using the diffraction element, only a diffracted beam of a specific order among diffracted beams generated by a diffraction element is used for recording and reproducing information. However, there is a concern that diffracted beams of other orders not used for recording and reproducing information may generate noise on information that will be recorded or reproduced. Therefore, it is necessary to prevent noise generated by a diffracted beam of other orders not used for recording and reproducing information.

SUMMARY

According to an aspect of an exemplary embodiment there is provided an optical pick-up apparatus for reproducing information recorded on an optical recording media or recording information on the optical recording medium including a light source unit creating beams; a diffraction element diffracting beams created from the light source unit; and an objective lens focusing a p order diffracted beam used for recording and reproducing information among a plurality of diffracted beams diffracted by the diffraction element on any one of a plurality of information recording layers formed on an optical recording medium and a p order diffracted beam not used for recording and reproducing information is focused on a point that is away from the plurality of information recording layers and the surface of the optical recording medium.

A difference $(f_{p-1}-f_p)$ between a focal point $(f_{p-1})$ of the p−1 order diffracted beam and a focal point $(f_p)$ of the p order diffracted beam and a difference $(f_{p+1}-f_p)$ between a focal point $(f_{p+1})$ of the p+1 order diffracted beam and a focusing point $(f_p)$ of the p order diffracted beam may satisfy the following conditional equations:

$$-D\max-WD \leq f_{p-1}-f_p \leq -D\max-s \times t$$

$$2 \times D\max-D\min+s \times t \leq f_{p+1}-f_p \leq 600 \ \mu m$$

Herein, Dmax represents a distance from the surface of the optical recording medium to a deepest information recording layer of the optical recording medium, Dmin represents a distance from the surface of the optical recording medium to a most shallow information recording layer of the optical recording medium, WD represents a working distance of the objective lens, t represents an absolute value of manufacturing tolerance of the optical recording medium and s represents a safety factor.

The working distance (WD) of the objective lens may be 300 μm.

An absolute value (t) of the manufacturing tolerance of the optical recording medium may be 5 μm.

The safety factor (s) may be at least 2.

The optical recording medium includes a dual layer blu-ray disc and the difference $(f_{p-1}-f_p)$ between the focal point $(f_{p-1})$ of the p−1 order diffracted beam and the focal point $(f_p)$ of the p order diffracted beam and the difference $(f_{p+1}-f_p)$ between the focal point $(f_{p+1})$ of the p+1 order diffracted beam and the focal point $(f_p)$ of the p order diffracted beam may satisfy the following conditional equations:

$$-400 \ \mu m \leq f_{p-1}-f_p \leq -110 \ \mu m$$

$$135 \ \mu m \leq f_{p+1}-f_p \leq 600 \ \mu m$$

The optical recording medium includes a dual layer blu-ray disc and the difference $(f_{p-1}-f_p)$ between the focal point $(f_{p-1})$ of the p−1 order diffracted beam and the focal point $(f_p)$ of the p order diffracted beam and the difference $(f_{p+1}-f_p)$ between the focal point $(f_{p+1})$ of the p+1 order diffracted beam and the focal point $(f_p)$ of the p order diffracted beam may satisfy the following conditional equations:

$$-60 \ \mu m \leq f_{p-1}-f_p \leq -40 \ \mu m$$

$$65 \ \mu m \leq f_{p+1}-f_p \leq 85 \ \mu m$$

The optical recording medium includes a triple layer blu-ray disc and the difference $(f_{p-1}-f_p)$ between the focal point $(f_{p-1})$ of the p−1 order diffracted beam and the focal point $(f_p)$ of the p order diffracted beam and the difference $(f_{p+1}-f_p)$ between the focal point $(f_{p+1})$ of the p+1 order diffracted beam and the focal point $(f_p)$ of the p order diffracted beam may satisfy the following conditional equations:

$$-400 \ \mu m \leq f_{p-1}-f_p \leq -110 \ \mu m$$

$$153 \ \mu m \leq f_{p+1}-f_p \leq 600 \ \mu m$$

The diffraction element may be formed on one side of the objective lens.

According to another exemplary embodiment, an optical recording and reproducing apparatus includes the optical pick-up apparatus having characteristics as described above.

According to another exemplary embodiment, there is provided an apparatus used in a device which records and/or reproduces information on/from an optical recording medium. the apparatus including a diffraction element which diffracts beams generated by a light source; and an objective lens which focuses a p order diffracted beam on a layer of the optical recording medium for recording and/or reproducing information and focuses a p±1 order diffracted beam on layers other than the layer of the optical recording medium for recording and/or reproducing information.

BRIEF DESCRIPTION OF THE DRAWINGS

The above and/or other aspects of the exemplary embodiments will be more apparent by describing the accompanying drawings, in which.

DETAILED DESCRIPTION OF EXEMPLARY EMBODIMENTS

Exemplary embodiments will be more apparent from the description taken with reference to the accompanying drawings. The exemplary embodiments described herein are introduced as an example to enhance an understanding and it should be understood that various modifications may be made to the exemplary embodiments described herein. In addition, to enhance an understanding of the exemplary embodiments, since accompanied drawings are not illustrated according to a real scale, measurements of some components can be illustrated exaggeratedly.

Figure 1:
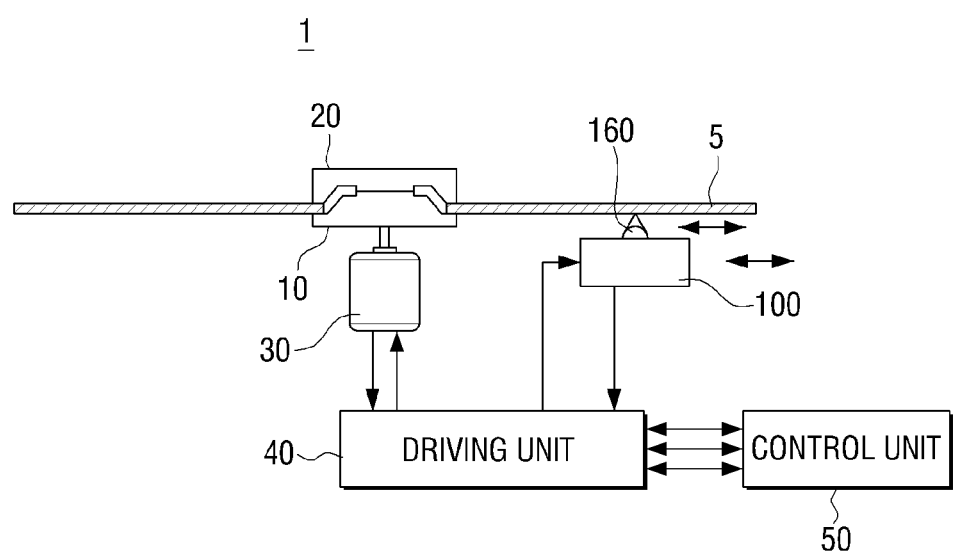
FIG. 1 is a schematic view illustrating an optical recording and reproducing apparatus according to an exemplary embodiment.

FIG. 1 is a schematic view illustrating an optical recording and reproducing apparatus (1) according to an exemplary embodiment.

An optical recording medium (5) is mounted on a turntable (10) and a clamp (20) chucks the optical recording medium (5) mounted on the turntable (10). Since a concrete composition of the turntable (10) and the clamp (20) may be understood easily by a skilled person in the related art, detailed description thereof is omitted.

The optical recording medium (5) may be a CD, a DVD, and a BD. In other words, the optical recording and reproducing apparatus (1) according to an exemplary embodiment may be compatible with various kinds of optical recording media.

A spindle motor (30) makes the optical recording medium (5) revolve.

Since an optical pick-up apparatus (100) is installed movably in a radius direction of the optical recording medium (5), it is possible to reproduce information recorded on the optical recording medium (5) or record information on the optical recording medium (5).

A driving unit (40) drives a spindle motor (30) and an optical pick-up apparatus (100) and a control unit (50) controls a focus servo and a track servo. A signal detected via an optical pick-up apparatus (100) is input into a control unit (50) via a driving unit (40). A control unit (50) based on a input from a driving unit (40) re-sends a focus servo and track servo command to a driving unit and a driving unit (40), according to a received command of a focus servo and a track servo, performs a focus servo and a tracking servo. Since a concrete composition of the driving unit (40) and the control unit (50) may be understood easily by a skilled person in a related art, detailed description thereof is omitted.

Figure 2:
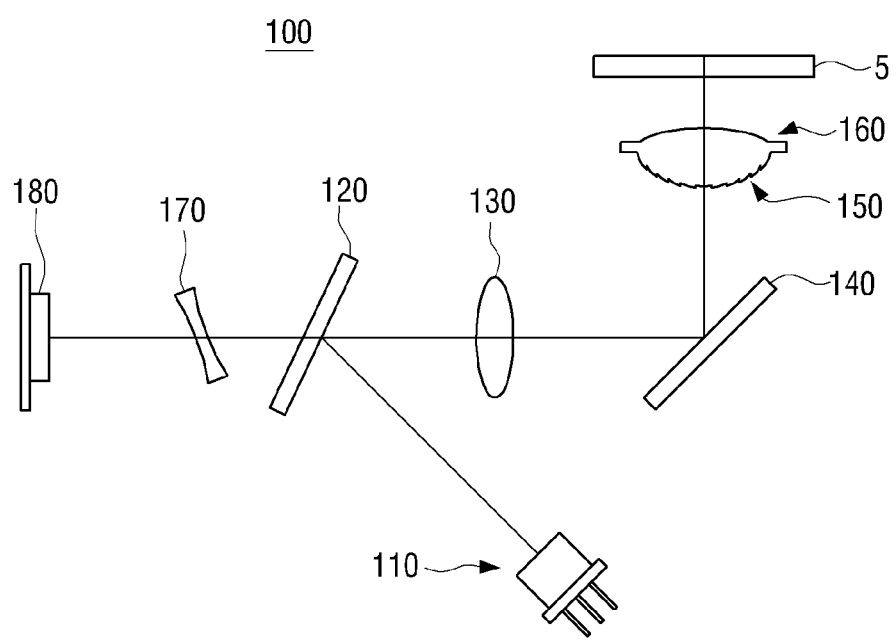
FIG. 2 is a schematic view illustrating an optical system of the optical pick-up apparatus illustrated in FIG. 1.

FIG. 2 is a schematic view illustrating an optical system of the optical pick-up apparatus (100) illustrated in FIG. 1.

A light source unit (110) generates beams necessary for recording and reproducing information. For example, if the optical recording medium (5) is a CD, the light source unit (110) generates a beam with a wavelength of 780 nm, if the optical recording medium (5) is a DVD, the light source unit (110) generates a beam with a wavelength of 660 nm and if the optical recording medium (5) is a BD. The light source unit (110) may include a plurality of laser diodes. A beam generated from a light source unit (110) heads toward the optical recording medium (5).

A beam splitter (120) reflects a portion of the beam generated from the light source unit (110) toward the light recording medium (5) and reflects a portion of the beam reflected on the optical recording medium (5) toward a photo detector (180).

A collimating lens (130) is disposed between a beam splitter (120) and an objective lens (160). The beam which passed through the light source unit (110) and is reflected on the beam splitter (120) is transformed into a parallel beam after passing the collimating lens (130).

The beam which passed the collimating lens (130) reflects on a reflection mirror (140) and then heads toward the objective lens (160). The reflection mirror (140) may be omitted as occasion demands.

A diffraction element (150) diffracts the beam generated from the light source unit (110) into a plurality of diffracted beams of various orders, (for example, order 0, order 1, order 2, . . . order n). Among these diffracted beams, only a certain order diffracted beam is used for recording and reproducing information and a certain order diffracted beam used for recording and reproducing information will be designated as the p order diffracted beam.

An objective beam (160) focuses the p order diffracted beam on an information recording layer formed on the optical recording medium (5). As the p order diffracted beam is focused on the information recording layer, it is possible to record information on the optical recording medium (5) or reproduce information recorded on the optical recording medium.

In an exemplary embodiment, the diffraction element (150) is formed on one surface of the objective lens (160). However, it should be understood that a separate diffraction element (150) separated from the objective lens (160) may be used.

A reflected beam reflected from the optical recording medium (5) passes the objective lens (160), the reflection mirror (140), the collimating lens (130), and the beam splitter (120) and heads toward the photodetector (180).

A sensor lens (170) is disposed between the beam splitter (120) and the photodetector (180). Thus, the sensor lens (170)

enlarges a spot of the reflected beam reflected from an optical recording medium (5) and forms an effective spot on the photodetector 180.

The photodetector (180) detects the reflected beam reflected from on optical recording medium (5) and transforms the reflected beam into an electronic signal. From the electronic signal, information recorded on the optical recording medium (5) may be obtained and a control signal necessary for a focus servo and a tracking servo of the optical pick-up apparatus (100) may be obtained.

An information recording layer of the optical recording medium (5) and the surface of the optical recording medium (5) have high reflectivity. Accordingly, noise is generated on information which is recorded or reproduced by the optical pick-up apparatus (100) as another order diffracted beam, except for a p order diffracted beam used for recording and reproducing information, is reflected on the information recording layer and on the surface of the optical recording medium (5). Such a phenomenon will be described in detail with reference to FIG. 3 and FIG. 4.

Figure 3:
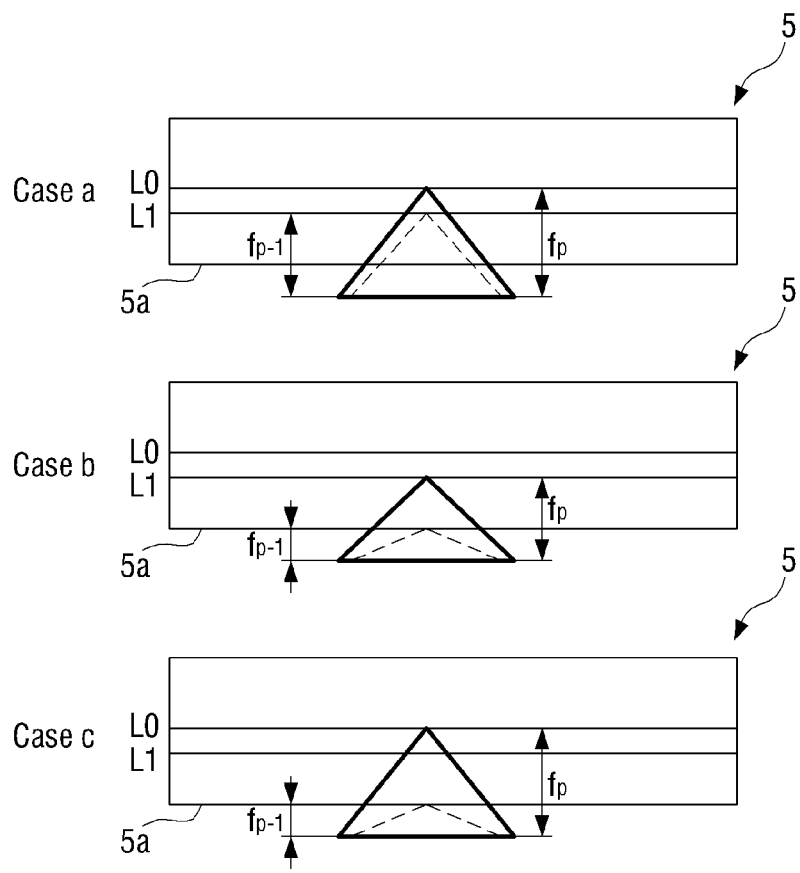
FIG. 3 is a schematic view illustrating a noise generating phenomenon by a p−1 order diffracted beam.
Figure 4:
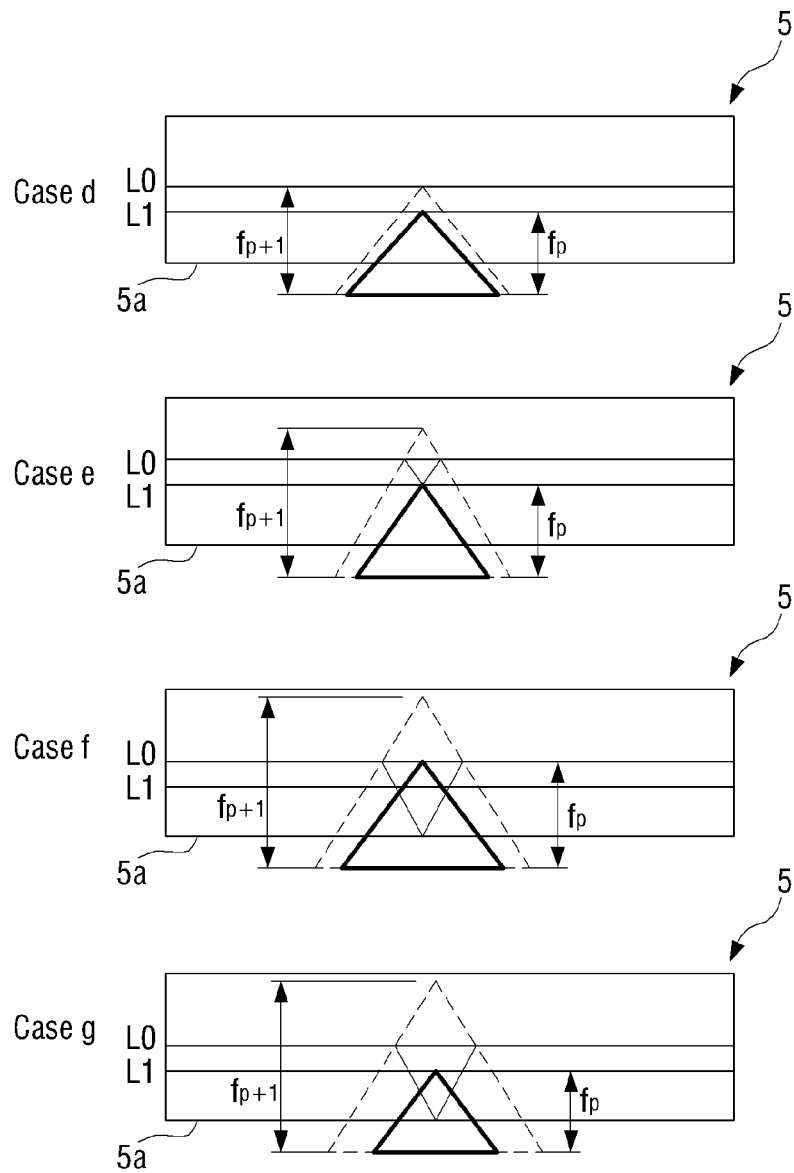
FIG. 4 is a schematic view illustrating a noise generating phenomenon by a p+1 order diffracted beam.

FIG. 3 is a schematic view illustrating a noise occurrence phenomenon by a p−1 order diffracted beam and FIG. 4 is a schematic view illustrating a noise occurrence phenomenon by a p+1 order diffracted beam.

For convenience of description, it is assumed that the optical recording medium (5) is a dual layer BD having two information recording layers. That is, the optical recording medium (5) illustrated in FIG. 3 and FIG. 4 is a dual layer BD.

According to a standard with regard to the dual layer BD (5), one information recording layer is formed on a point that is 100 μm away from the surface (5a) of a BD (5) and it is called "L0". Additionally, another information recording layer is formed on a point that is 75 μm away from the surface (5a) of the BD (5) and it is called "L1". A cover layer is formed between L1 and the surface (5a) of the BD (5). This cover layer protects information recording layers such as L0 and L1 from the external environment.

In FIG. 3, a thick line is a p order diffracted beam and a dotted line is a p−1 order diffracted beam. The p−1 order diffracted beam is a diffracted beam focused on a nearer point from the objective lens (160) than the p order diffracted beam. For clarity of drawings, the objective lens (160) is not illustrated in FIG. 3.

Case a of FIG. 3 illustrates a case where the p order diffracted beam is focused on L0 and the p−1 order diffracted beam is focused on L1. Hereinafter, a focal point of the p order diffracted beam from the objective lens (160) will be represented as $f_p$ and a focal point of the p−1 order diffracted beam from the objective lens (160) will be represented as $f_{p-1}$. Since the p−1 order diffracted beam, is not used for recording and reproducing information, but is focused on L1, the diffracted beam generates noise on information which will be used for recording or reproducing by an optical pick-up apparatus (100). More specifically, assuming a distance between L0 and L1 in the dual layer BD (5) is 25 μm (100 μm−75 μm) and assuming that manufacturing tolerance of the dual layer DB (5) is ±5 μm, a possibility of a noise occurrence increases if a difference ($f_{p-1}-f_p$) between the focal point ($f_{p-1}$) of the p−1 order diffracted beam and the focal point ($f_p$) of the p order diffracted beam is within the following range:

$$-30\ \mu m(=-25\ \mu m-5\ \mu m) \leq f_{p-1}-f_p \leq -20\ \mu m(=-25\ \mu m+5\ \mu m)$$

Case b of FIG. 3 illustrates a case where the p order diffracted beam is focused on L1 and the p−1 order diffracted beam is focused on the surface (5a) of the dual layer BD (5). Like the above case, since the p−1 order diffracted beam is not used for recording and reproducing information but is focused on the surface (5a) of the dual layer BD (5), the diffracted beam generates noise on information which will be used for recording or reproducing by the optical pick-up apparatus (100). More specifically, assuming that a distance between L1 and the surface (5a) from the dual layer BD (5) is 75 μm and assuming that manufacturing tolerance of the dual layer DB (5) is ±5 μm, a possibility of a noise occurrence increases if a difference ($f_{p-1}$) between the focal point ($f_{p-1}$) of the p−1 order diffracted beam and the focal point ($f_p$) of the p order diffracted beam is within the following range:

$$-80\ \mu m(=-75\ \mu m-5\ \mu m) \leq f_{p-1}-f_p \leq -70\ \mu m(=-75\ \mu m+5\ \mu m)$$

Case c of FIG. 3 illustrates a case where the p order diffracted beam is focused on L0 and the p−1 order diffracted beam is focused on the surface (5a) of the dual layer BD (5). Like the above case, since the p−1 order diffracted beam is not used for recording and reproducing information but is focused on the surface (5a) of the dual layer BD (5), the diffracted beam generates noise on information which will be used for recording or reproducing by the optical pick-up apparatus (100). More specifically, assuming that a distance between L0 and the surface (5a) from the dual layer BD (5) is 100 μm and assuming that manufacturing tolerance of the dual layer DB (5) is ±5 μm, a possibility of a noise occurrence increases if a difference ($f_{p-1}-f_p$) between the focal point ($f_{p-1}$) of the p−1 order diffracted beam and the focal point ($f_p$) of the p order diffracted beam is within the following range:

$$-105\ \mu m(=-100\ \mu m-5\ \mu m) \leq f_{p-1}-f_p \leq -95\ \mu m(=-100\ \mu m+5\ \mu m)$$

Consequently, if the difference ($f_{p-1}-f_p$) between the focal point ($f_{p-1}$) of the p−1 order diffracted beam and the focal point ($f_p$) of the p order diffracted beam is designed out of the range ($-30\ \mu m \leq f_{p-1}-f_p \leq -20\ \mu m$, $-80\ \mu m \leq f_{p-1} \leq -70\ \mu m$, and $-105\ \mu m \leq f_{p-1}-f_p \leq -95\ \mu m$) described above, a noise occurrence by the p−1 order diffracted beam may be prevented. Especially, if the difference ($f_{p-1}-f_p$) between the focal point ($f_{p-1}$) of the p−1 order diffracted beam and the focal point ($f_p$) of the p order diffracted beam is under −105 μm, a noise occurrence by the p−1 order diffracted beam may be prevented more accurately.

Only the dual layer BD (5) where two information recording layers (L0, L1) are formed is described above. However, where a multiple layer BD where three or more information recording layers are formed is applied, the following conditional equation should be satisfied to prevent the noise occurrence by the p−1 order diffracted beam.

$$f_{p-1}-f_p \leq -D\max - s \times t$$

Here, Dmax represents a distance from the surface (5a) of the optical recording medium (5) to a deepest information recording layer, t represents an absolute value of manufacturing tolerance of the optical recording medium (5) and s represents a safety factor. If the above equation is satisfied, although the p order diffracted beam is focused on the deepest information recording layer (corresponds to L0 in the exemplary embodiment of FIG. 3) from the surface (5a) of the optical recording medium (5), a noise occurrence may be prevented by the p−1 order diffracted beam because the p−1 order diffracted beam is focused on a point that is away from the surface (5a) of the optical recording medium (5) or another information recording layer (corresponds to L1 in the exemplary embodiment of FIG. 3).

For the dual layer DB (5) illustrated in FIG. 3, Dmax is 100 μm. Here, in case where the manufacturing tolerance (t) is 5 μm and the safety factor (s) is 2, a noise occurrence by the p−1 order diffracted beam may be prevented if the difference ($f_{p-1}-f_p$) between the focal point ($f_{p-1}$) of the p−1 order diffracted beam and the focal point ($f_p$) of the p order diffracted beam is within the following range:

$$f_{p-1}-f_p \leq -110 \text{ μm}$$

More preferably, the difference ($f_{p-1}-f_p$) between the focal point ($f_{p-1}$) of the p−1 order diffracted beam and the focal point ($f_p$) of the p order diffracted beam may be satisfied with the following equation:

$$-D\max-WD \leq f_{p-1}-f_p \leq -D\max-s \times t$$

Here, WD represents a working distance of the objective lens (160). In the above equation, the lowest limit of the difference ($f_{p-1}-f_p$) between the focal point ($f_{p-1}$) of the p−1 order diffracted beam and the focal point ($f_p$) of the p order diffracted beam is set because the working distance of the objective lens (160) is considered.

In general, since the working distance of the objective lens (160) for the BD is 300 μm, it is preferable that the difference ($f_{p-1}-f_p$) between the focal point ($f_{p-1}$) of the p−1 order diffracted beam and the focal point ($f_p$) of the p order diffracted beam is within the following range:

$$-400 \text{ μm} \leq f_{p-1}-f_p \leq -110 \text{ μm}$$

Hereinafter, a noise occurrence phenomenon by the p+1 order diffracted beam will be described with reference to FIG. 4. In FIG. 4, a thick line is a p order diffracted beam and the dotted line is the p+1 order diffracted beam. The p+1 order diffracted beam is a diffracted beam focused on the point that is away from the objective lens (160) farther than the p order diffracted beam. For clarity of the drawing, the objective lens (160) is not illustrated in FIG. 4.

Case d of FIG. 4 illustrates a case where the p order diffracted beam is focused on L1 and the p+1 order diffracted beam is focused on L0. Hereinafter, f will be represented as the focal point of the p order diffracted beam from the objective lens (160) and f will be defined as a focal point of a p+1 order diffracted beam based on the objective lens (160). The p+1 order diffracted beam not used for recording and reproducing information is focused on L0, thereby generating noise on information which will be recorded or reproduced by the optical pick-up apparatus (100). More specifically, assuming that the distance between L0 and L1 on the BD (5) is 25 μm (100 μm−75 μm) and assuming that manufacturing tolerance of the dual layer DB(5) is 5 μm, the possibility of noise occurrence increases if the difference ($f_{p+1}-f_p$) between the focal point ($f_{p+1}$) of the p+1 order diffracted beam and the focal point ($f_p$) of the p order diffracted beam is within the following range:

$$20 \text{ μm}(=25 \text{ μm}-5 \text{ μm}) \leq f_{p+1}-f_p \leq 30 \text{ μm}(=25 \text{ μm}+5 \text{ μm})$$

Case e of FIG. 4 illustrates a case where the p order diffracted beam is focused on L1 and the p+1 order diffracted beam is reflected on L0 and focused on L1. In case e of FIG. 4, the thin line represents the p+1 order diffracted beam reflected on L0. In cases f-g of FIG. 4, the thin line represents the reflected p+1 order diffracted beam.

As the above case, the p+1 order diffracted beam is not used for recording and reproducing information but is focused on L1, thereby generating noise on information which will be recorded or reproduced by the optical pick-up apparatus (100). More specifically, assuming that the distance between L0 and L1 on a BD (5) is 25 μm and assuming the manufacturing tolerance of the dual layer DB (5) is ±5 μm, the possibility of the noise occurrence increases if the difference ($f_{p+1}-f_p$) between the focal point ($f_{p+1}$) of the p+1 order diffracted beam and the focal point ($f_p$) of the p order diffracted beam is within the following range:

$$45 \text{ μm}(=50 \text{ μm}-5 \text{ μm}) \leq f_{p+1}-f_p \leq 55 \text{ μm}(=50 \text{ μm}+5 \text{ μm})$$

Case f of FIG. 4 illustrates a case where the p order diffracted beam is focused on L0 and the p+1 order diffracted beam is reflected on L0 and focused on the surface (5a) of the BD (5). As the above case, the p+1 order diffracted beam is not used for recording and reproducing information but is focused on the surface (5a) of the DB (5), thereby generating noise on information which will be recorded or reproduced by the optical pick-up apparatus (100). More specifically, assuming the distance between L0 and the surface (5a) on the BD (5) is 100 μm and assuming that manufacturing tolerance of the dual layer DB (5) is ±5 μm, the possibility of the noise occurrence increases if the difference ($f_{p+1}-f_p$) between the focal point ($f_{p+1}$) of the p+1 order diffracted beam and the focal point ($f_p$) of the p order diffracted beam is within the following range:

$$95 \text{ μm}(=100 \text{ μm}-5 \text{ μm}) \leq f_{p+1}-f_p \leq 105 \text{ μm}(=100 \text{ μm}+5 \text{ μm})$$

Case g of FIG. 4 illustrates a case where the p order diffracted beam is focused on L1 and the p+1 order diffracted beam reflected on L0 and focused on the surface (5a) of the BD (5). As the above case, the p+1 order diffracted beam is not used for recording and reproducing information but is focused on the surface (5a) of the DB (5), thereby generating noise on information which will be recorded or reproduced by the optical pick-up apparatus (100). More specifically, assuming that the distance between L0 and the surface (5a) on the DB (5) and the distance between L1 and the surface (5a) on the DB are 100 μm and 75 μm respectively and assuming that the manufacturing tolerance of the dual layer DB (5) is ±5 μm, the possibility of the noise occurrence increases if the difference ($f_{p+1}-f_p$) between the focal point ($f_{p+1}$) of the p+1 order diffracted beam and the focal point ($f_p$) of the p order diffracted beam is within the following range:

$$120 \text{ μm}(=2 \times 100 \text{ μm}-75 \text{ μm}-5 \text{ μm}) \leq f_{p+1}-f_p \leq 130 \text{ μm}(=2 \times 100 \text{ μm}-75 \text{ μm}+5 \text{ μm})$$

Consequently, if the difference ($f_{p+1}-f_p$) between the focal point ($f_{p+1}$) of the p+1 order diffracted beam and the focal point ($f_p$) of the p order diffracted beam is out of the range (20 μm≤$f_{p+1}-f_p$≤30 μm, 45 μm≤$f_{p+1}-f_p$≤55 μm, 95 μm≤$f_{p+1}-f_p$≤105 μm, and 120 μm≤$f_{p+1}-f_p$≤130 μm) described above, the noise occurrence by the p+1 order diffracted beam may be prevented. Especially, if the difference $f_{p-1}-f_p$ between the focal point ($f_{p+1}$) of the p+1 order diffracted beam and the focal point ($f_p$) of the p order diffracted beam is over 130 μm, the noise occurrence by the p+1 order diffracted beam may be prevented more surely.

Only a dual layer BD (5) on which two information recording layers (L0, L1) are formed is described above. However, where the multiple layer BD on which three or more information recording layers are formed, the following conditional equation should be satisfied to prevent the noise occurrence by the p+1 order diffracted beam.

$$2 \times D\max - D\min + t \times s \leq f_{p+1}-f_p$$

Here, Dmax represents a distance from the surface (5a) of the optical recording medium (5) to a deepest information recording layer, Dmin represents a distance from the surface (5a) of the optical recording medium (5) to shallowest information recording layer, t represents an absolute value of the manufacturing tolerance and s represents the safety factor. If the above equation is satisfied, although the p order diffracted beam is focused on the deepest information recording layer (corresponds to L1 in the exemplary embodiment of FIG. 4) from the surface (5a) of the optical recording medium (5), the noise occurrence by the p+1 order diffracted beam may be prevented because the p+1 order diffracted beam is focused on the point that is away from the surface (5a) of the optical recording medium (5) or the information recording layer (corresponds to L0 in the exemplary embodiment of FIG. 4).

In the case of DB (5) illustrated in FIG. 4, Dmax is 100 μm and Dmin is 75 μm. Here, in case where the manufacturing tolerance (t) is 5 μm and the safety factor (s) is 2, the noise occurrence by a p+1 order diffracted beam may be prevented if the difference ($f_{p+1}-f_p$) between the focal point ($f_{p+1}$) of the p+1 order diffracted beam and the focal point ($f_p$) of the p order diffracted beam is within the following range:

$$135\ \mu m \leq f_{p-1}-f_p$$

More preferably, a difference ($f_{p+1}-f_p$) between the focal point ($f_{p+1}$) of the p+1 order diffracted beam and the focal point ($f_p$) of the p order diffracted beam may satisfy the following equation:

$$2 \times Dmax - Dmin + t \times s \leq i f_{p+1} - f_p \leq 600\ \mu m$$

In the above equation, since a hybrid disc to which a DVD method and a BD method are all applied is considered, the upper limit (600 μm) of a difference ($f_{p+1}-f_p$) between the focal point ($f_{p+1}$) of the p+1 order diffracted beam and the focal point ($f_p$) of the p order diffracted beam is set. In the hybrid disc, an information recording layer for a DVD and an information recording layer for a BD exist altogether. According to the DVD standard, the information recording layer for the DVD is formed on a position that is 600 μm away from the surface. Therefore, if the difference ($f_{p+1}-f_p$) between the focal point ($f_{p+1}$) of the p+1 order diffracted beam and the focal point ($f_p$) of the p order diffracted beam exceeds 600 μm, there is a concern that the p+1 order diffracted beam may be focused on the information recording layer for the DVD.

As described above, according to an exemplary embodiment, if the p order diffracted beam used for recording and reproducing information is focused on one information recording layer of the optical recording medium (5), a noise generated on recorded or reproduced information may be prevented because the p±1 order diffracted beam not used for recording and reproducing information is not focused on the surface of the optical recording medium (5) or another information recording layer. To adjust the focal point difference between the p±1 order diffracted beam and the p order diffracted beam, it is possible to change the structure of diffraction granting of the diffracted element (150) or the optical parameter of the objective lens (160) or the collimating lens (130). However, it should be understood that adjusting focal point difference between the p±1 order diffracted beam and the p order diffracted beam by using other various kinds of methods is possible.

In the above description, it should be understood it is just an example that the manufacturing tolerance of the optical recording medium (5) is described as ±5 μm. Additionally, it should be understood that it is just an example that the safety factor (s) is described as 2. According to a necessity, the safety factor (s) may be over 2. In addition, the safety factor (s) may be set below 2 according to the development of technologies.

Figure 5:
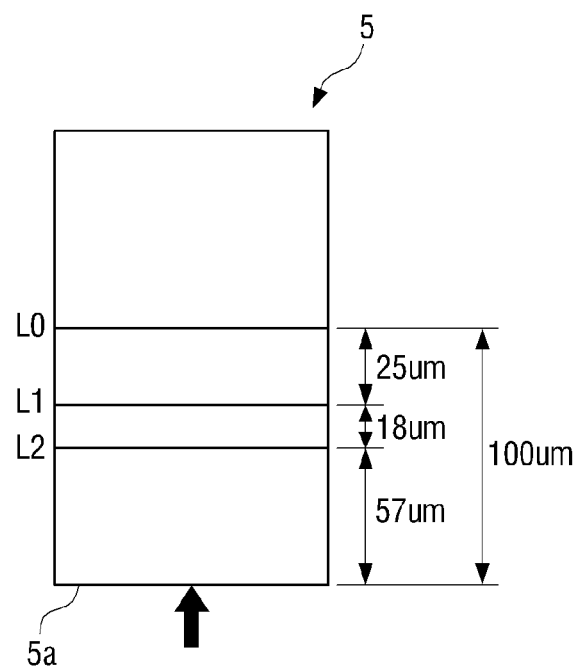
FIG. 5 is a schematic view illustrating a structure of triple layer BD.

In FIG. 3 and FIG. 4, the case where the optical recording medium (5) which is the dual layer BD is described. With reference to FIG. 5, the case where the optical recording medium (5) which is the triple layer BD will be described.

FIG. 5 is a schematic view illustrating the structure of the triple layer BD (5).

According to the standard of the triple layer BD (5), one information recording layer called "L0" is formed on the point that is 100 μm away from the surface (5a) of the BD (5). Another information recording layer called "L1" is formed on the point that is 75 μm away from the surface (5a) of the BD (5). Another information recording layer called "L2" is formed on the point that is 57 μm away from the surface (5a) of the BD (5).

In this case, Dmax is 100 μm and Dmin is 57 μm. In a case where a working distance (WD) of the objective lens (160) is 300 μm, an absolute value (t) of the manufacturing tolerance is 5 μm and the safety factor (s) is 2, a noise occurrence by a p±1 order diffracted beam can be prevented if a difference ($f_{p\pm 1}-f_p$) between the focal point ($f_{p\pm 1}$) of the p±1 order diffracted beam and the focal point ($f_p$) of the p order diffracted beam is designed within the following range:

$$-400\ \mu m (=-100\ \mu m - 300\ \mu m) \leq f_{p-1}-f_p \leq -110\ \mu m (=-100\ \mu m - 2 \times 5\ \mu m)$$

$$153\ \mu m (=2 \times 100\ \mu m - 57\ \mu m + 2 \times 5\ \mu m) \leq f_{p+1}-f_p \leq 600\ \mu m$$

Figure 6:
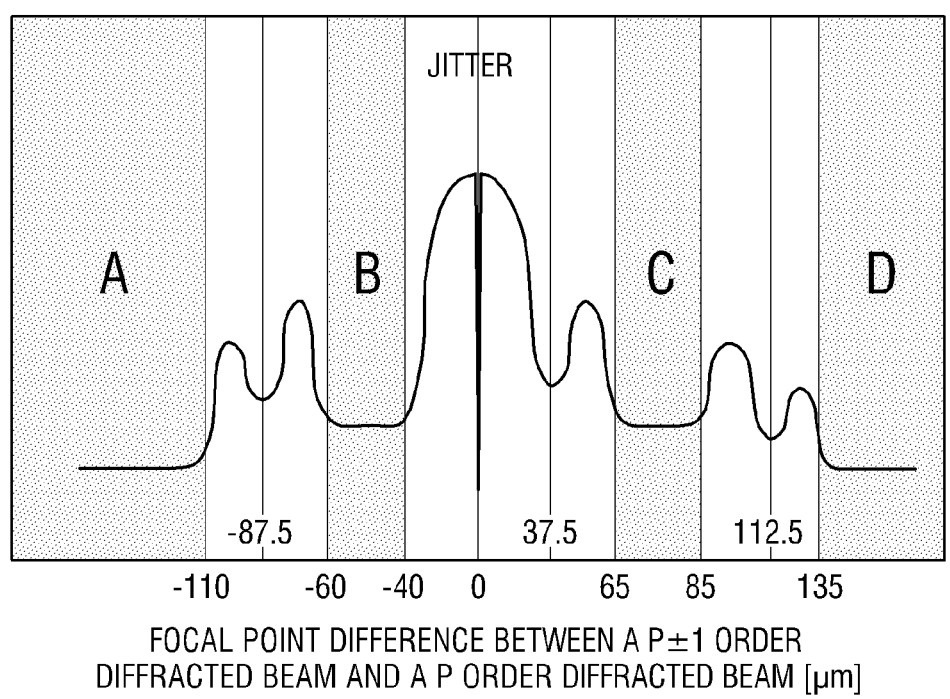
FIG. 6 is a graph showing calculated results of a jitter value according to a focal point difference between a p±1 order diffracted beam and a p order diffracted beam in case where a dual layer BD is used.

FIG. 6 is a graph showing results after the calculation of a jitter value according to the focal point difference ($f_{p\pm 1}-f_p$) between the p±1 order diffracted beam and the p order diffracted beam. In the horizontal axis of FIG. 6, a section corresponding to a negative number represents the difference ($f_{p-1}-f_p$) between the focal point ($f_{p-1}$) of the p−1 order diffracted beam and the focal point ($f_p$) of the p order diffracted beam. A section corresponding to a positive number represents the difference ($f_{p+1}-f_p$) between the focal point ($f_{p+1}$) of the p+1 diffracted beam and the focal point ($f_p$) of the p order diffracted beam. As shown in FIG. 6, noise is greatly reduced in section A where the difference ($f_{p-1}-f_p$) between the focal point ($f_{p-1}$) of the p−1 order diffracted beam and the focal point ($f_p$) of the p order diffracted beam is below −110 μm and the section D where the difference ($f_{p+1}-f_p$) between the focal point ($f_{p+1}$) of the p+1 order diffracted beam and the focal point ($f_p$) of the p order diffracted beam is over 135 μm. Sections A and D illustrated in FIG. 6 satisfy the equation described above.

It is hard to design an optical pick-up apparatus (100), where the difference ($f_{p\pm 1}-f_p$) between the focal point ($f_{p\pm 1}$) of the p±1 order diffracted beam and the focal point of the p order diffracted beam satisfy the above equation. However, it is possible to design an optical pick-up apparatus (100) meeting the specifications of sections B and C where the jitter value is relatively low. In other words, for the dual layer BD, it is possible to design an optical pick-up apparatus where the difference ($f_{p\pm 1}-f_p$) between the focal point ($f_{p\pm 1}$) of the p±1 order diffracted beam and the focal point ($f_p$) of the p order diffracted beam to exist within the following range:

$$-60\ \mu m \leq f_{p-1}-f_p \leq -40\ \mu m$$

$$65\ \mu m \leq f_{p+1}-f_p \leq 85\ \mu m$$

As described above with reference to FIGS. 3 and 4, if the difference ($f_{p\pm 1}-f_p$) between the focal point ($f_{p\pm 1}$) of the p±1 order diffracted beam and the focal point ($f_p$) of the p order diffracted beam is within the above range and the p order diffracted beam is focused on one information recording layer of the optical recording medium (5), the p±1 order diffracted beam that is not used for recording and reproducing information is not focused on the optical recording medium (5) or the surface of another information recording layer.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An optical pick-up apparatus for reproducing information recorded on an optical recording medium or recording information on the optical recording medium comprising:
a light source unit generating beams;
a diffraction element which diffracts beams which are generated from the light source unit; and
an objective lens which focuses a p order diffracted beam which is used for recording and reproducing information among a plurality of diffracted beams which are diffracted by the diffraction element on any one of a plurality of information recording layers which are formed on the optical recording medium,
wherein a p±1 order diffracted beam which is not used for recording and reproducing information is focused on a point that is away from the plurality of information recording layers and a surface of the optical recording medium,
wherein a difference ($f_{p-1}-f_p$) between a focal point ($f_{p-1}$) of the p−1 order diffracted beam and a focal point ($f_p$) of the p order diffracted beam, and a difference ($f_{p+1}-f_p$) between a focal point ($f_{p+1}$) of the p+1 order diffracted beam and the focal point ($f_p$) of the p order diffracted beam satisfy the following conditional equations:

$$-D\mathrm{max}-WD \leq f_{p-1}-f_p \leq -D\mathrm{max}-s \times t$$

$2 \times D\mathrm{max}-D\mathrm{min}+s \times t \leq f_{p+1}-f_p \leq 600$ μm, wherein Dmax represents a distance from the surface of the optical recording medium to a deepest information recording layer of the optical recording medium, Dmin represents a distance from the surface of the optical recording medium to a shallowest information layer of the optical recording medium. WD represents a working distance of the objective lens, t represents an absolute value of manufacturing tolerance of the optical recording medium, and s represents a safety factor.

2. The apparatus as claimed in claim 1, wherein the working distance (WD) of the objective lens is 300 μm.

3. The apparatus as claimed in claim 1, wherein the absolute value (t) of the manufacturing tolerance of the optical recording medium is 5 μm.

4. The apparatus as claimed in claim 1, wherein the safety factor (s) is at least 2.

5. The apparatus as claimed in claim 1, wherein the optical recording medium comprises a dual layer blu-ray disc, and the difference ($f_{p-1}-f_p$) between the focal point ($f_{p-1}$) of the p−1 order diffracted beam and the focal point ($f_p$) of the p order diffracted beam, and the difference ($f_{p+1}-f_p$) between the focal point ($f_{p+1}$) of the p+1 order diffracted beam and the focal point ($f_p$) of the p order diffracted beam satisfy the following conditional equations:

$$-400 \text{ μm} \leq f_{p-1}-f_p \leq -110 \text{ μm},$$

$$135 \text{ μm} \leq f_{p+1}-f_p \leq 600 \text{ μm}.$$

6. The apparatus as claimed in claim 1, wherein the optical recording medium comprises a triple layer blu-ray disc, and a difference ($f_{p-1}-f_p$) between a focal point ($f_{p-1}$) of the p−1 order diffracted beam and a focal point ($f_p$) of the p order diffracted beam and a difference ($f_{p+1}-f_p$) between a focal point ($f_{p+1}$) of the p+1 order diffracted beam and the focal point ($f_p$) of the p order diffracted beam satisfy the following conditional equations:

$$-400 \text{ μm} \leq f_{p-1}-f_p \leq -110 \text{ uμ}$$

$$153 \text{ μm} \leq f_{p+1}-f_p \leq 600 \text{ μm}.$$

7. The apparatus as claimed in claim 1, wherein the diffraction element is formed on one side of the objective lens.

8. An optical recording and reproducing apparatus comprising the optical pick-up apparatus of claim 1.

9. An optical pick-up apparatus for reproducing information recorded on an optical recording medium or recording information on the optical recording medium comprising:
a light source unit generating beams;
a diffraction element which diffracts beams which are generated from the light source unit; and
an objective lens which focuses a p order diffracted beam which is used for recording and reproducing information among a plurality of diffracted beams which are diffracted by the diffraction element on any one of a plurality of information recording layers which are formed on the optical recording medium,
wherein a p±1 order diffracted beam which is not used for recording and reproducing information is focused on a point that is away from the plurality of information recording layers and a surface of the optical recording medium, and wherein the optical recording medium includes a dual layer blu-ray disc, and
a difference ($f_{p-1}-f_p$) between a focal point ($f_{p-1}$) of the p−1 order diffracted beam and a focal point ($f_p$) of the p order diffracted beam and a difference ($f_{p+1}-f_p$) between focal point ($f_{p+1}$) of the p+1 order diffracted beam and the focal point ($f_p$) of the p order diffracted beam satisfy following the following conditional equations:

$$-60 \text{ μm} \leq f_{p-1}-f_p \leq -40 \text{ μm}$$

$$65 \text{ μm} \leq f_{p+1}-f_p \leq 85 \text{ μm}$$

10. An optical pick-up apparatus which records and/or reproduces information on/from an optical recording medium, the optical pick-up apparatus comprising:
a light source unit which generates beams;
a diffraction element which diffracts the generated beams; and
an objective lens which focuses a p order diffracted beam on a layer of the optical recording medium for recording and/or reproducing information and focuses a p±1 order diffracted beam on layers other than the layer of the optical recording medium for recording and/or reproducing information,
wherein a difference ($f_{p-1}-f_p$) between a focal point ($f_{p-1}$) of the p−1 order diffracted beam and a focal point ($f_p$) of the p order diffracted beam, and a difference ($f_{p+1}-f_p$) between a focal point ($f_{p+1}$) of the p+1 order diffracted beam and the focal point ($f_p$) of the p order diffracted beam satisfy the following conditional equations:

$$-D\mathrm{max}-WD \leq f_{p-1}-f_p \leq -D\mathrm{max}-s \times t$$

$2 \times D\mathrm{max}-D\mathrm{min}+s \times t \leq f_{p+1}-f_p \leq 600$ μm, wherein Dmax represents a distance from the surface of the optical recording medium to a deepest information recording layer of the optical recording medium, Dmin represents a distance from the surface of the optical recording medium to a shallowest information layer of the optical recording medium, WD represents a working distance of the objective lens, t represents an absolute value of manufacturing tolerance of the optical recording medium, and s represents a safety factor.

11. The apparatus as claimed in claim 10, wherein the optical recording medium comprises a dual layer blu-ray disc, and the difference ($f_{p-1}-f_p$) between the focal point ($f_{p-1}$) of the p−1 order diffracted beam and the focal point ($f_p$) of the p order diffracted beam, and the difference ($f_{p+1}-f_p$) between the focal point ($f_{p+1}$) of the p+1 order diffracted beam and the focal point ($f_p$) of the p order diffracted beam satisfy the following conditional equations:

$-400\ \mu m \leq f_{p-1}-f_p \leq -110\ \mu m$ $135\ \mu m \leq f_{p+1}-f_p \leq 600\ \mu m.$

12. The apparatus as claimed in claim 10, wherein the optical recording medium comprises a triple layer blu-ray disc, and the difference ($f_{p-1}-f_p$) between the focal point ($f_{p-1}$) of the p−1 order diffracted beam and the focal point ($f_p$) of the p order diffracted beam and the difference ($f_{p+1}-f_p$) between a focal point ($f_{p+1}$) of the p+1 order diffracted beam and the focal point ($f_p$) of the p order diffracted beam satisfy the following conditional equations:

$-400\ \mu m \leq f_{p-1}-f_p \leq -110\ \mu m$ $153\ \mu m \leq f_{p+1}-f_p \leq 600\ \mu m.$

13. The apparatus as claimed in claim 10, wherein the absolute value (t) of the manufacturing tolerance of the optical recording medium is 5 μm.

14. The apparatus as claimed in claim 13, wherein the safety factor (s) is at least 2.

15. An optical pick-up apparatus which records and/or reproduces information on/from an optical recording medium, the optical pick-up apparatus comprising:

a light source unit which generates beams;

a diffraction element which diffracts the generated beams; and an objective lens which focuses a p order diffracted beam on a layer of the optical recording medium for recording and/or reproducing information and focuses a p±1 order diffracted beam on layers other than the layer of the optical recording medium for recording and/or reproducing information, wherein the optical recording medium includes a dual layer blu-ray disc, and a difference ($f_{p-1}-f_p$) between a focal point ($f_{p-1}$) of the p−1 order diffracted beam and a focal point ($f_p$) of the p order diffracted beam and a difference ($f_{p+1}-f_p$) between focal point ($f_{p+1}$) of the p+1 order diffracted beam and the focal point ($f_p$) of the p order diffracted beam satisfy following the following conditional equations:

$-60\ \mu m \leq f_{p-1}-f_p \leq -40\ \mu m$ $65\ \mu m \leq f_{p+1}-f_p \leq 82\ \mu m.$

16. An apparatus used in a device which records and/or reproduces information on/from an optical recording medium, the apparatus comprising:

a diffraction element which diffracts beams generated by a light source; and an objective lens which focuses a p order diffracted beam on a layer of the optical recording medium for recording and/or reproducing information and focuses a p±1 order diffracted beam on layers other than the layer of the optical recording medium for recording and/or reproducing information, wherein a difference ($f_{p-1}-f_p$) between a focal point ($f_{p-1}$) of the p−1 order diffracted beam and a focal point ($f_p$) of the p order diffracted beam, and a difference ($f_{p+1}-f_p$) between a focal point ($f_{p+1}$) of the p+1 order diffracted beam and the focal point ($f_p$) of the p order diffracted beam satisfy the following conditional equations:

$-D\max-WD \leq f_{p-1}-f_p \leq -D\max-s \times t$ $2 \times D\max - D\min + s \times t \leq f_{p+1}-f_p \leq 600$ μm, wherein Dmax represents a distance from the surface of the optical recording medium to a deepest information recording layer of the optical recording medium. Dmin represents a distance from the surface of the optical recording medium to a shallowest information layer of the optical recording medium. WD represents a working distance of the objective lens, t represents an absolute value of manufacturing tolerance of the optical recording medium, and s represents a safety factor.

* * * * *